DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 8

T901,009

HERBICIDAL COMBINATIONS

Cecil W. Le Fevre, Franklin, Idaho, and Vlady Regentik, Buena Park, Vernon W. Woestemeyer, Yorba Linda, and William G. Woods, Fullerton, Calif., assignors to United States Borax & Chemical Corporation, Los Angeles, Calif.

Filed June 21, 1971, Ser. No. 155,276

Int. Cl. A01n *9/02*

U.S. Cl. 71—121

No Drawing. 13 Pages Specification

Combinations of substituted 2,4-dinitro - 6 - trifluoromethyl-1,3-phenylenediamine compounds with other herbicidally active compounds, such as substituted ureas, triazines, carbamates, uracils, anilides, amides and benzimidazoles, as well as the halophenoxyaliphatic acids, benzoic acids, nitrophenols, chlorofluorenol derivatives, dipyridylium derivatives, halogenated alkanoic acids and inorganic herbicides. The combinations with substituted ureas, carbamates, halobenzoic acids and nitrophenols are particularly preferred because of a synergistic herbicidal activity.